June 30, 1925.
W. H. EDMONDSON
ATTACHMENT FOR CULTIVATORS
Filed Oct. 1, 1924
1,544,295
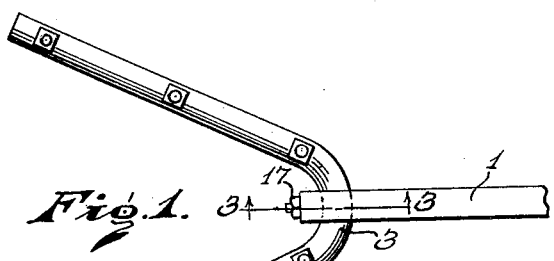
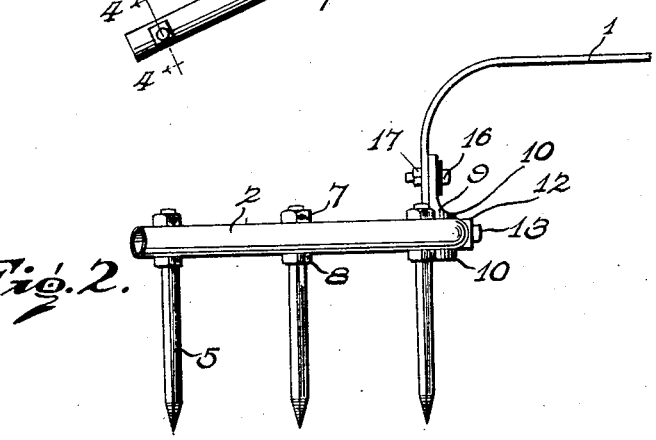
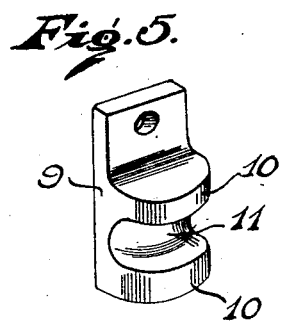
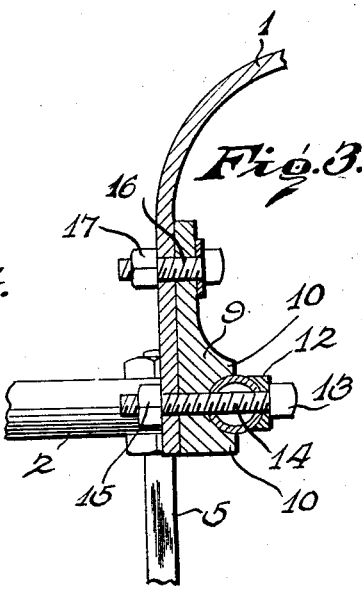
Inventor
W. H. Edmondson.
By Larry Raney, Attorney.

Patented June 30, 1925.

1,544,295

UNITED STATES PATENT OFFICE.

WALTER H. EDMONDSON, OF ANADARKO, OKLAHOMA.

ATTACHMENT FOR CULTIVATORS.

Application filed October 1, 1924. Serial No. 741,029.

*To all whom it may concern:*

Be it known that I, WALTER H. EDMONDSON, a citizen of the United States, residing at Anadarko, in the county of Caddo and State of Oklahoma, have invented certain new and useful Improvements in Attachments for Cultivators, of which the following is a specification.

This invention is an attachment for cultivators and seeks to provide a harrowing device which may be easily applied to the cultivator stock or beam and drawn along a furrow so as to loosen the surface soil and facilitate the growth of young tender plants. The invention is illustrated in the accompanying drawing and will be hereinafter fully set forth.

In the drawing:

Figure 1 is a plan view of my improved device;

Fig. 2 is a side elevation of the same;

Fig. 3 is an enlarged section on the line 3—3 of Fig. 1;

Fig. 4 is an enlarged detail section on the line 4—4 of Fig. 1, and

Fig. 5 is a detail perspective of a bracket or clamping block which is employed.

In the drawing, the reference numeral 1 indicates a portion of the stock or beam of an ordinary wheeled cultivator. In carrying out my invention, I employ a beam or bar 2 which is preferably tubular in form, as shown clearly in Figs. 2, 3 and 4. This bar is bent midway its ends, as indicated at 3, whereby it is given a substantially V-shaped formation presenting rearwardly diverging side members or arms. At intervals in each side member or arm openings 4 are formed therethrough to receive the upper ends of harrow teeth 5 which are preferably straight shanks or spikes having tapered lower ends adapted to readily scratch and loosen the surface soil. The upper extremities of the teeth are exteriorly threaded, as indicated at 6. Clamping nuts 7 and 8 are mounted upon this threaded portion of each tooth above and below the harrow bar 2 to constitute clamping jaws whereby the tooth will be firmly secured in the harrow bar but may be easily removed in the event of breakage. It will be readily understood that the lower nut 8 is fitted on the tooth and the upper end of the tooth then inserted upwardly through the harrow bar, after which the upper nut 7 is fitted to the tooth and turned home against the harrow bar to clamp the tooth in place.

Within the bight defined by the rear side of the bend 3, I fit a bracket or foot piece 9 which is provided on its front side at and adjacent its lower end with forwardly projecting lugs or ears 10 adapted to extend above and below the harrow bar, as shown clearly in Fig. 3. The front surface 11 of the bracket between these lugs or ears is concave vertically and convex horizontally so that it will conform to the curvature of the harrow bar at the bend and fit snugly thereto. Against the front side of the bend, a washer 12 is fitted, the said washer having a flat front side and a curved rear side whereby it will fit closely to the front of the harrow bar and may be engaged firmly by the head 13 of a bolt 14 which is inserted through the washer, the harrow bar and the bracket 9, as shown clearly in Fig. 3. The end of the cultivator stock or beam 1 depends at the rear of the bracket 9 in contact with the rear side of the same and the bolt 14 passes through an opening provided therefor in the said beam or stock so that, when the nut 15 is turned home against the stock, all the parts will be firmly secured together. A second bolt 16 is inserted through openings provided therefor in the stock and the upper end of the bracket 9 and equipped with a nut 17 whereby the upper end of the bracket will be firmly clamped to the stock and the depending portion of the stock reinforced so that the harrow will be firmly carried.

In use, the harrow attachment is adjusted through manipulation of the usual hand levers provided on the cultivator frame, and the harrow obviously will run in the furrow which is produced by the usual action of the cultivator. The harrow is of such dimensions that it will fit within the furrow without extending upon the ridges at the sides of the furrow so that it will operate effectively upon the soil immediately over and around the plants which are trying to break through the earth. The attachment is very firmly secured to the cultivator by the arrangement and construction of parts shown in the drawing while at the same time it may be quickly and easily removed when its use is no longer desired. The means for attaching the harrow to the cultivator beam, furthermore, is compact so that it is not apt to become entangled with weeds or other growth which may be in its path and also is not apt to be broken or damaged through contact with large objects at the side of the furrow.

Having thus described the invention, I claim:

The combination of a harrow bar presenting rearwardly diverging side members and a curved bend connecting the front ends of said members, teeth carried by the side members of the harrow bar, a bracket having forwardly projecting lugs on its front side near its lower end to engage above and below the bend of the harrow bar and having its surface between said lugs conforming to the surface of the harrow bar at the bend, a washer fitted to the front side of the bend, a securing bolt inserted through the washer, the harrow bar and said bracket to clamp the parts together, and means engageable through the upper end of the bracket to secure the same to the cultivator stock.

In testimony whereof I affix my signature.

WALTER H. EDMONDSON. [L. S.]